(No Model.)
F. M. WALKER.
BELT FOR TRANSMITTING POWER.
No. 357,432. Patented Feb. 8, 1887.
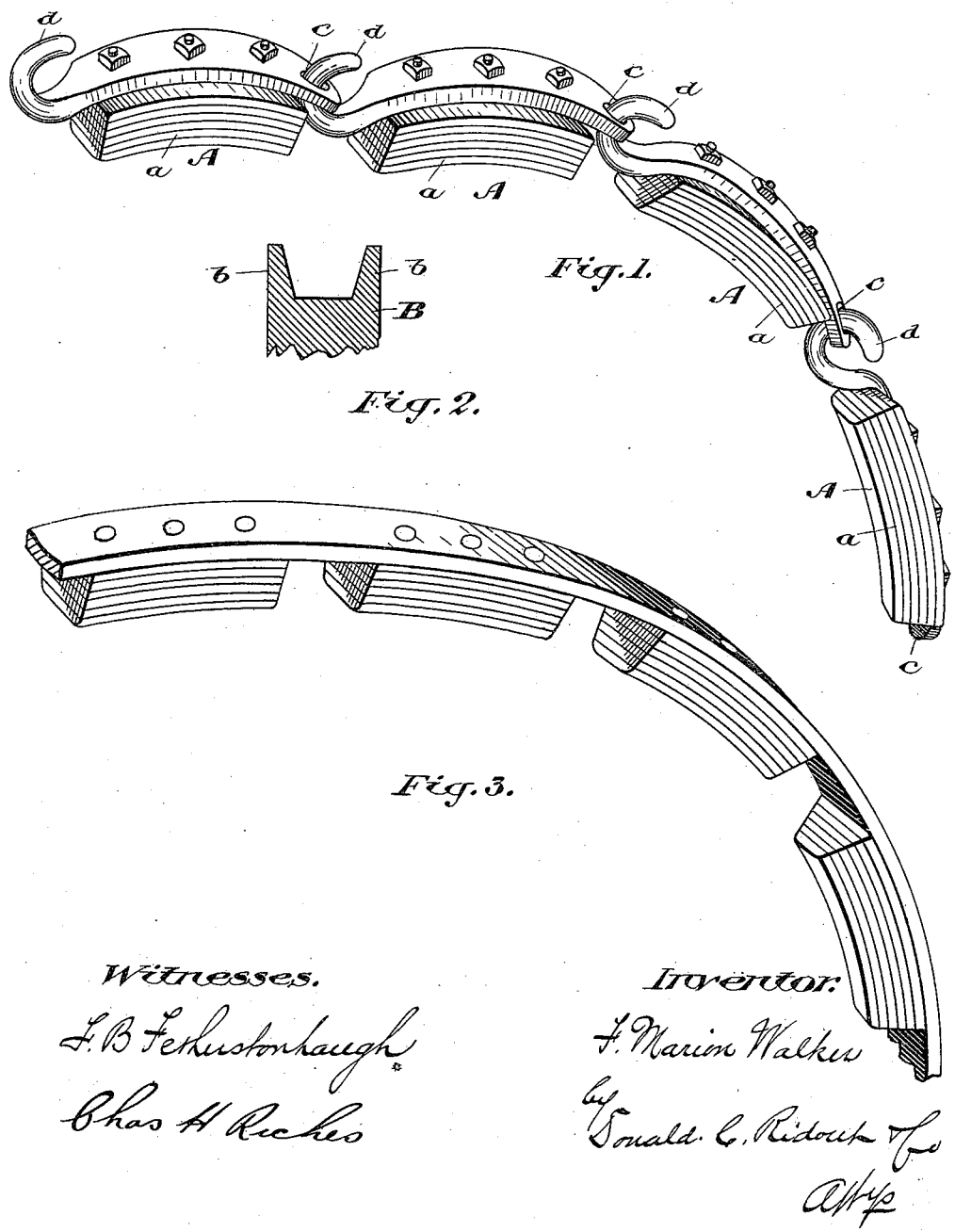
Witnesses.
L. B. Featherstonhaugh
Chas. H. Riches
Inventor:
F. Marion Walker
by Donald C. Ridout &co
att'y

UNITED STATES PATENT OFFICE.

FRANCIS M. WALKER, OF TORONTO, ONTARIO, CANADA.

BELT FOR TRANSMITTING POWER.

SPECIFICATION forming part of Letters Patent No. 357,432, dated February 8, 1887.

Application filed August 21, 1886. Serial No. 211,503. (No model.)

*To all whom it may concern:*

Be it known that I, FRANCIS MARION WALKER, of the city of Toronto, in the county of York, in the Province of Ontario, Canada, machinist, have invented a certain new and useful Improvement in Belts for Transmitting Power, of which the following is a specification.

The invention relates to that class of belt designed to fit between the outwardly-flaring flanges formed on a friction-pulley, and the object of the invention is to design a belt of the required thickness possessing all the necessary flexibility, together with a strength which will render the belt practically indestructible; and it consists, essentially, of a series of leather segments composed of a number of thicknesses riveted or otherwise rigidly bound together, each segment being independently riveted or otherwise rigidly fastened to a metal plate having eyes or hooks formed at either end to connect with the plates of the adjoining segments, substantially as hereinafter more particularly explained.

Figure 1 exhibits four segments made and connected together in accordance with my invention. Fig. 2 is a cross-section of the rim of the pulley used in connection with my belt. Fig. 3 shows four segments connected together by a leather belt.

Friction-pulleys of the class upon which mine is an improvement have been made prior to my invention of a series of leather segments composed of layers of leather riveted or otherwise cemented together, the said segments being connected together by an outer leather belt, as indicated by Fig. 3.

In practice it has been found impossible to make the connecting belt sufficiently strong to resist the strain it is subjected to without making the belt so heavy that it will render it practically valueless, owing to the want of the necessary flexibility.

My belt consists of a series of segments, A, composed of layers of leather $a$, to make the belt the requisite thickness to fit between the outwardly-flaring flanges $b$ of the friction-pulley B. On the back of each of these segments A, I bolt, rivet, or otherwise rigidly secure a metal plate, at one end of which an eye, $c$, is made, and at its other end a hook, $d$, so that the various segments may be connected together, as indicated in Fig. 1, the entire strain being thus directed against the metal plates, which are made sufficiently strong to resist any desired pressure. A belt constructed in this manner will possess the necessary flexibility and also the required strength to resist any strain.

I am aware of the Patent No. 135,409, and make no claim to the construction shown therein as forming part of my invention. By means of my round hooks and eyes I can readily and easily couple or uncouple any two segments for the purpose of repairs or for lengthening or shortening the belt. By this construction there is no danger of the sections becoming detached by the straightening of the coupling devices, as in the case of the construction shown in the patent above referred to.

It will be noticed on reference to Fig. 1 that my hooks $d$ are bent downward at the end of the segment, so as to occupy the spaces between the segments, thus adding materially to the strength of the belt, making the breaks between the segments less open, and serving to prevent endwise movement or displacement of the leather sections. To this I attach importance. I also deem it important that the segments A and the plates be formed on the arc of a circle, whereby they more readily accommodate themselves to the pulleys over which they pass and prevent strain, such as is liable to occur in the use of the device above referred to.

What I claim as my invention is—

1. As an improved article of manufacture, a belt composed of sections, each formed on the arc of a circle, and plates rigidly secured to the back of said sections and formed on the arc of a circle, the said plates being flexibly connected together, substantially as described.

2. As an improved article of manufacture, the belt described, the same consisting of a plurality of leather sections, A, each formed on the arc of a circle, and a plurality of metal plates, one for each section, said plates being formed each on the arc of a circle and rigidly secured to the sections A, and with eyes $c$ and hooks $d$, said hooks being bent downwardly into the space between said sections and detachably connecting the same together, substantially as described.

Toronto, July 3, 1886.

FRANCIS M. WALKER.

In presence of—
CHARLES C. BALDWIN,
F. BARNARD FETHERSTONHAUGH.